United States Patent [19]

Simpson

[11] 4,097,413
[45] Jun. 27, 1978

[54] DESULFURIZATION PROCESS AND CATALYST

[75] Inventor: Howard D. Simpson, Irvine, Calif.

[73] Assignee: Union Oil Company of California, Los Angeles, Calif.

[21] Appl. No.: 751,383

[22] Filed: Dec. 17, 1976

[51] Int. Cl.² .................... B01J 21/04; B01J 23/88
[52] U.S. Cl. .................................. 252/465; 208/216
[58] Field of Search .................................. 252/465

[56] References Cited

U.S. PATENT DOCUMENTS 2,911,374  11/1959  Malley et al. .................... 252/465

Primary Examiner—W. J. Shine
Attorney, Agent, or Firm—Lannas S. Henderson; Richard C. Hartman; Dean Sandford

[57] ABSTRACT

Highly active cobalt-molybdenum-alumina desulfurization catalysts containing 18-30 weight-percent of $MoO_3$ are prepared by first comulling boehmite alumina with aqueous ammonium molybdate solution, drying the resulting mixture, then comulling with a soluble cobalt salt and water, thereafter forming the resulting mixture into extrudates, and finally calcining the extrudates under controlled temperature conditions correlated with the molybdenum content of the catalyst so as to preserve adequate surface area and prevent the formation of large crystallites of cobalt molybdate. This method of preparation permits effective utilization of molybdenum in amounts up to about 30 weight-percent $MoO_3$, a result not obtainable by conventional impregnation techniques.

4 Claims, No Drawings

DESULFURIZATION PROCESS AND CATALYST

BACKGROUND AND SUMMARY OF INVENTION

Undoubtedly the most thoroughly explored and widely used catalyst for the hydrodesulfurization of mineral oils and fractions thereof is of the cabalt-molybdenum-alumina type, hereinafter referred to as "CMA" catalysts. Several methods have been developed and utilized for the manufacture of CMA catalysts, the most common probably being impregnation of preformed gamma alumina supports with aqueous solutions of ammonium molybdate and a soluble cobalt salt, either simultaneously or sequentially, followed by calcining at temperatures ranging between about 900° and 1400° F. An obvious principal objective in the formulation and manufacture of such catalysts is to develop the highest possible desulfurization activity per unit volume of catalyst, consistent with economic limitations.

To develop maximum activity in CMA catalysts, it would be difficult to conceive of a more obvious avenue to explore than that of increasing the content of active metals in the catalyst. However, due to various limitations such as pore volume, pore size and surface area of the alumina support, as well as other more imponderable factors, it has not as yet been found possible to derive worthwhile benefit from increasing the metal loading of CMA catalysts beyond certain rather definite levels, usually between about 18–20 weight-percent $MoO_3$ and 4–5 weight-percent CoO. As a consequence virtually all commercial CMA catalysts contain between about 12 and 16 weight-percent $MoO_3$ and about 2–5 weight-percent CoO. In commercially prepared CMA catalysts, activity usually begins to level off at about 16 weight-percent $MoO_3$, and at higher $MoO_3$ levels, above about 22 weight-percent, a very definite loss in activity is usually observed. The foregoing is aptly illustrated by the following Example.

EXAMPLE 1

Two CMA catalysts (A and B) were prepared by first impregnating preformed gamma alumina supports with ammoniacal solutions of ammonium heptamolybdate, followed by drying and calcining at 1200° F for 2 hours, then cooling and impregnating with aqueous solutions of cobalt nitrate, followed by a final drying and calcining at 1200° F. The strength of the impregnating solutions was such that finished catalyst A contained 22 weight-percent $MoO_3$ and 4.7 weight-percent CoO, while catalyst B contained 24.1 weight-percent $MoO_3$ and 5.6 percent CoO. Both catalysts had substantially identical surface areas of 200 $m^2/g$.

Each of the foregoing catalysts was then activity tested for the hydrodesulfurization of a Kuwait residual oil having an API gravity of 16.7° and a sulfur content of 3.79 weight-percent. The testing was carried out in an autoclave at 685° F and 1500 psig hydrogen pressure, uitlizing in each test 20 grams of catalyst and 150 grams of the resid feedstock. At five one-hour intervals, 5-ml samples of the feed were withdrawn and analyzed for sulfur content, and the relative desulfurization reaction rates, based on second order kinetics, were calculated. The rate for catalyst A containing 22 percent $MoO_3$ was found to be 166, while the rate for catalyst B containing 24.1 percent $MoO_3$ was 125. (Both rates are expressed relative to that of a laboratory standard catalyst which contained 12.1 percent $MoO_3$ and 4 percent CoO and had the arbitrary standard reaction rate of 100.) It is thus evident that increasing the metals content of CMA catalysts beyond certain levels can lead to an actual decrease in activity.

The present invention is based upon my discovery of a manufacturing method for CMA catalysts which permits the effective utilization of molybdenum in amounts up to about 30 weight-percent $MoO_3$ and of cobalt in amounts up to about 12 weight-percent CoO. Briefly summarized, this method involves first comulling and reacting a solution of ammonium molybdate with alumina predominantly in the form of boehmite, and then drying the mixture at relatively low temperatures, insufficient to convert the boehmite alumina to gamma alumina. The resulting powder is then comulled with a water soluble cobalt salt and sufficient water to provide an extrudable mixture. The final mixture is then extruded, dried and calcined under carefully controlled temperature conditions.

When the foregoing technique is utilized to prepare CMA catalysts containing more than about 18 weight-Percent $MoO_3$, the final calcination temperature is very critical. Calcining such catalysts at temperatures in excess of about 1250° F has been found to result in a drastic reduction in surface area, accompanied by the growth of cobalt molybdate crystallites of X-ray-detectable size. Both of these phenomena result in substantial loss of activity. As will be shown hereinafter, if the so prepared catalyst contains less than about 18 weight-percent $MoO_3$, calcination temperatures up to about 1400° F can be utilized without forming detectable cobalt molybdate or prohibitively reducing the surface area. For the metal-rich catalysts of this invention, the final calcination is carried out at a temperature which is (a) between about 900° and 1250° F, and (b) correlated with the $MoO_3$ content of the catalyst so as to give a final surface area of at least $M/0.14$ $m^2/g$, where M is the $MoO_3$ content of the catalyst. As will be shown hereinafter this latter limitation means that for catalysts containing 26 weight-percent or more of $MoO_3$ the calcining temperature should be below about 1200° F.

In U.S. Pat. No. 2,911,374 a method for the manufacture of CMA catalysts is disclosed which, except for the disclosed final calcination temperatures of 1250°–1350° F, is embraced herein as a species of the present invention. In this patent, the major portion of the boehmite alumina to be utilized in the catalyst, in the form of a wet filter cake, is first mulled with aqueous ammonium molybdate solution, and then spray dried to a water content of about 20–40 weight-percent. The remaining boehmite alumina filter cake is slurried with a cobalt salt solution and then admixed with the spray-dried alumina-molybdena composite. The entire mixture is then mulled and extruded, dried and calcined at 1250°–1350° F. As will be shown hereinafter this procedure can be effective for catalysts containing the 7–20 weight-percent $MoO_3$ disclosed in the patent, but for catalysts containing the high molybdena content required herein, said procedure results in a drastic loss in surface area and the appearance of large crystallites of cobalt molybdate, a result which is prevented herein by utilizing lower final calcination temperatures.

DETAILED DESCRIPTION

The boehmite alumina employed herein as a starting material may be prepared by any of the procedures well known in the prior art, as illustrated by the procedure described in U.S. Pat. No. 2,675,115. In accordance with this process, a boehmite alumina filter cake is prepared by precipitating aluminum hydroxide from aqueous alkali metal aluminate solutions by the addition of a mineral acid under controlled pH conditions. The resulting washed filter cake, which is substantially free of alkali metals, may contain about 10–20 weight-percent solids. This filter cake may be employed as such, as disclosed in U.S. Pat. No. 2,911,374, or it may be spray-dried to a water content of about 20–40 weight-percent, as determined by weight loss on ignition (LOI) at 1000° C. The drying should not be carried to the extent of converting any substantial portion of the boehmite alumina to other forms such as gamma alumina.

The molybdate solution is ordinarily prepared by dissolving the calculated amount of ammonium molybdate or ammonium heptamolybdate in sufficient water to provide a damp powder, paste or slurry when blended with the boehmite alumina component. To provide a more stable solution, excess 28% ammonia solution can be added to the solution in amounts of about 10–50 volume-percent. To economize on the subsequent drying step it is preferred to utilize only a sufficient volume of molybdate solution to provide a damp powder with the alumina.

Mixing of the molybdate solution with the alumina is preferably carried out in a conventional muller. Mulling is continued at ambient temperatures for a sufficient time, usually about 10 minutes to 1 hour, to provide a uniform mixture. The mulled mixture is then dried and deammoniated to an LOI of about 20–40 weight-percent at drying temperatures below 500° F, preferably about 200°–350° F. At temperatures above about 500° F, boehmite begins to lose water of hydration, forming gamma alumina. It is preferred that not more than about 10% of the boehmite be converted to gamma alumina prior to the addition of cobalt.

If the molybdate-alumina mixture is in the form of a damp powder, drying can be carried out in a conventional circulating air oven. If it is in the form of a slurry, conventional spray drying techniques can be utilized.

After drying, the powder is mulled with the calculated amount of a water-soluble cobalt salt and sufficient water to produce an extrudable paste. The preferred cobalt salt is cobalt nitrate, but other salts such as the acetate, formate, etc., may also be utilized. In the preferred modification, all of the cobalt salt is dissolved in the water phase before mulling, but when utilizing the technique described in U.S. Pat. No. 2,911,374, some or all of the cobalt may be precombined with a portion of the alumina prior to admixture with the molybdena-alumina composite.

Extrusion is carried out using conventional equipment at pressures between about 200 and 3000 psi, to form extrudates having a diameter between about 1/20 and ¼ inch. The extrudates are then dried, typically in a circulating air oven, at temperatures between about 200° and 500° F. Final calcination is then carried out in a furnace or oven, preferably in circulating air, with temperatures incrementally increasing over a period of about 1–12 hours, to the maximum calcination temperature, in the range of about 900°–1250° F, which is thereafter maintained for about 0.5–10 hours.

The maximum calcination temperature is a critical aspect of the invention. The benefits of increased $MoO_3$ loadings are not realized unless the final catalyst displays a surface area which is at least equal to M/0.14, and preferably at least M/0.10, where M is the weight-percent $MoO_3$ in the catalyst, and unless X-ray detectable crystallites (~20 Å) of cobalt molybdate, $CoMoO_4$, are substantially absent. Both loss of surface area and the formation of $CoMoO_4$ crystallites occur at lower calcination temperatures as the $MoO_3$ content of the catalyst increases. Therefore, the maximum calcination temperature should not exceed the value which gives a surface area below M/0.14, and preferably should not exceed the value which gives a surface area of M/0.10. These values can be readily determined experimentally for any given catalyst.

The principal characteristics of the CMA catalysts prepared as above described are as follows:

|  | Broad Range | Preferred Range |
| --- | --- | --- |
| $MoO_3$, wt. % | 18–30 | 22–28 |
| CoO, wt. % | 4–12 | 6–10 |
| $MoO_3$/CoO wt. Ratio | 2–6 | 3–5 |
| Surface area, m²/g | 150–300 | 200–280 |

The finished catalysts can be utilized under conventional conditions to desulfurize any mineral oil feedstock, including gas oils, diesel fuels, naphthas, jet fuels, kerosene, cycle oils, residual oils, etc. Preferably the catalysts are presulfided prior to use by contact with a stream of sulfiding gas such as $H_2S$—$H_2$ mixtures containing about 1–10 vol.% $H_2S$, at temperatures between about 200° and 700° F. Operative desulfurization conditions fall within the following ranges:

|  | Broad Range | Preferred Range |
| --- | --- | --- |
| Temp. ° F | 400–800 | 600–750 |
| Pressure, psig | 500–3000 | 700–2000 |
| LHSV | 0.3–5 | 1–4 |
| $H_2$/oil Ratio; MSCF/B | 1–10 | 2–7 |

The following examples demonstrate certain critical aspects of the invention:

EXAMPLE 2

A catalyst (C) of this invention was prepared by first dissolving 83 g of ammonium heptamolybdate in sufficient 50:50 (by volume) water and 28% ammonia solution to give 230 ml of total solution. This solution was then blended with 230 g of spray dried boehmite alumina having a water content of about 20–25 wt.%, and the mixture was mulled for about 20 minutes, resulting in a homogeneous powder which was damp but not wet. The powder was then dried overnight in a circulating air oven at about 180° F. The dried powder was then mulled for an additional 40 minutes, followed by mulling with 230 ml of an aqueous solution containing dissolved therein 97 g of $Co(NO_3)_2.6H_2O$. After mulling for a time sufficient to achieve an extrudable consistency, the mull was extruded into 1/16 inch extrudates and dried at 250° F. The dried extrudates were then calcined for 2 hours at 1200° F.

A comparison catalyst, D, was prepared by the procedure described above, except that the proportions were:

| Ammonium heptamolybdate | 83 g |
| --- | --- |
| $NH_4OH$ solution | 48 ml |
| Volume of molybdate solution | 310 ml |
| Boehmite alumina | 400 g |
| $Co(NO_3)_2.6H_2O$ | 90 g |
| Volume of $Co(NO_3)_2$ solution | 350 ml |

Analysis of the respective catalysts showed the following characteristics:

| Catalyst | Wt.% MoO₃ | Wt.% CoO | Surface Area, m²/g | X-ray Analysis |
|---|---|---|---|---|
| C | 26.2 | 8.8 | 198 | $\gamma Al_2O_3$(~40A) CoMoO₄ (trace) |
| D | 15.9 | 6.0 | 313 | $\gamma Al_2O_3$ (37 A) |

In view of the barely adequate surface area of catalyst C, and the formation of trace amounts of $CoMoO_4$, it is apparent that the calcination temperature of 1200° F is higher than optimum for this catalyst. Nevertheless, both catalysts were activity tested for the desulfurization of a light diesel oil having an API gravity of 34.7° and containing 0.65 wt.% sulfur, and at 700 psig, LHSV=5, 3000 SCF/B of hydrogen and 700° F, catalyst C was found to have an activity of 139, relative to 100 for catalyst D.

EXAMPLE 3

To illustrate more specifically the effect of calcination temperature, several samples of another catalyst prepared by the method of catalyst C, and containing 26 wt.% $MoO_3$ and 9 wt.% CoO, were calcined for about ½ hour at various temperatures. Surface area determinations and X-ray diffraction analyses of the calcined samples showed the following properties:

Table 1

| Calcination Temp., ° F | Surface Area m²/g | X-ray Analysis Phase & Crystallite size (A) | |
|---|---|---|---|
| | | $\gamma Al_2O_3$ | CoMoO₄ |
| 1142 | 237 | 40 | — |
| 1193 | 208 | 45 | — |
| 1220 | 177 | 49 | — |
| 1228 | 143 | 62 | trace |
| 1238 | 132 | 65 | 1700 |
| 1246 | 120 | 59 | 1400 |
| 1260 | 114 | 69 | 1200 |

From the foregoing, it is apparent that for this catalyst the minimum acceptable surface area (M/0.14 = 186) would result from a calcination temperature of about 1200° F; higher temperatures result in drastic loss of surface area and formation of large crystallites of $CoMoO_4$.

In contrast to the foregoing, when several samples of another catalyst prepared by the method of catalyst D, and containing 16.1 wt.% $MoO_3$ and 5.7 wt.% CoO, were calcined at various temperatures and analyzed, the results were as follows:

Table 2

| Calcination Temp.° F | Surface Area m²/g | X-ray Analysis Phase & Crystallite Size (A) | |
|---|---|---|---|
| | | $\gamma Al_2O_3$ | CoMoO₄ |
| 1198 | 319 | 41 | — |
| 1210 | 312 | 45 | — |
| 1220 | 304 | 44 | — |
| 1230 | 304 | 44 | — |
| 1240 | 300 | 33 | — |
| 1254 | 285 | 42 | — |
| 1265 | 286 | 49 | — |
| 1330 | 215 | 45 | — |
| 1392 | 178 | 60 | — |
| 1463 | 75 | 95 | trace |
| 1510 | 57 | 80 | 72,000 |

The foregoing confirms that for this catalyst the calcination temperatures of 1250°-1350° F specified in U.S. Pat. No. 2,911,374 are indeed feasible, the minimum acceptable surface area (M/0.14 = 115) resulting from a calcination temperature of about 1425° F.

EXAMPLE 4

Another catalyst containing 26 wt.% $MoO_3$ and 9 wt.% CoO was prepared by a method which simulates in most respects the procedure of Example 1 of U.S. Pat. No. 2,911,374. About 144 g of ammonium heptamolybdate was dissolved in about 250 ml H₂O plus 80 ml of 28% ammonia solution. The solution was then mulled with 250 g of spray dried boehmite alumina and dried overnight at 110° C. Then 150 g of the same boehmite alumina was mixed well with 350 ml of an aqueous solution containing 160 g of $Co(NO_3)_2.6H_2O$. The resulting slurry was added to the molybdate $Al_2O_3$ powder, and the mixture was mulled for 35 minutes to form an extrudable mixture. After extruding and drying, several samples were calcined at various temperatures and analyzed with the following results:

Table 3

| Calcination Temp., ° F | Surface Area m²/g | X-ray Analysis Phase & Crystallite Size (A) | |
|---|---|---|---|
| | | $Al_2O_3$ | CoMoO₄ |
| 1112 | 268 | 41 | — |
| 1157 | 244 | 35 | — |
| 1192 | 208 | 41 | — |
| 1204 | 195 | 44 | trace |
| 1220 | 155 | 44 | 720 |
| 1229 | 165 | 53 | 660 |
| 1242 | 137 | 62 | 660 |

Here, the minimum acceptable surface area of 186 m²/g also results at a calcination temperature of about 1200° F.

The catalyst calcined at 1192° F was found to have a desulfurization activity of 130, relative to the activity of 100 for catalyst D, when tested in the same manner.

The following claims and their obvious equivalents are believed to define the true scope of the invention.

I claim:

1. A method for the manufacture of a hydrodesulfurization catalyst which comprises:
   (1) comulling boehmite alumina with sufficient of an aqueous ammonium molybdate solution to provide about 18–30 weight-percent of $MoO_3$ in the finished catalyst;
   (2) drying the composite from step (1) at temperatures below about 500° F to a water content of between about 20 and 40 weight-percent;
   (3) intimately admixing the dried composite from step (2) with sufficient of a water-soluble cobalt salt to provide about 4–12 weight-percent of CoO in the finished catalyst, and with sufficient water to provide an extrudable paste;
   (4) extruding the paste into extrudates having a diameter between about 1/20 and ¼ inch; and
   (5) calcining the extrudates at a temperature which is (a) between about 900° and 1250° F and (b) correlated with the $MoO_3$ content of said catalyst so as to give a final surface area of at least M/0.14 m²/g, where M is the weight-percent of $MoO_3$ in said catalyst.

2. A method as defined in claim 1 wherein sufficient ammonium molybdate and water-soluble cobalt salt are employed in steps (1) and (3) to provide in the finished catalyst about 22–28 weight-percent $MoO_3$ and about 6–10 weight-percent CoO.

3. A method as defined in claim 1 wherein said calcining in step (5) is carried out at a temperature correlated with the MoO$_3$ content of said catalyst so as to give a final surface area of at least about M/0.10 m$^2$/g, where M is the weight-percent of MoO$_3$ in said catalyst.

4. A method as defined in claim 3 wherein sufficient ammonium molybdate and water-soluble cobalt salt are employed in steps (1) and (3) to provide in the finished catalyst about 22–28 weight-percent MoO$_3$ and about 6–10 weight-percent CoO.

* * * * *